United States Patent [19]

Hoenel et al.

[11] Patent Number: 5,525,666
[45] Date of Patent: Jun. 11, 1996

[54] SOLVENT-FREE AQUEOUS SYNTHETIC-RESIN DISPERSION AND PROCESS FOR THE PREPARATION AND USE THEREOF

[75] Inventors: Michael Hoenel, Wiesbaden; Markus A. Schafheutle, Hochheim; Achim Voelker; Gerd Walz, both of Wiesbaden; Susanne Wehner, Villmar; Peter Ziegler, Mainz, all of Germany

[73] Assignee: Hoechst Aktiengesellschaft, Frankfurt, Germany

[21] Appl. No.: 297,038

[22] Filed: Aug. 29, 1994

[30] Foreign Application Priority Data

Sep. 13, 1993 [DE] Germany .................. 43 31 061.3

[51] Int. Cl.⁶ ............................................. C08F 2/16
[52] U.S. Cl. .................................... 524/458; 523/414
[58] Field of Search .................... 524/458; 523/414

[56] References Cited

U.S. PATENT DOCUMENTS

| 3,523,925 | 8/1970 | Kamal et al. .................. 260/77.5 |
| 4,238,594 | 12/1980 | Pampouchidis .................. 528/69 |
| 4,356,276 | 10/1982 | Hoenig et al. .................. 523/404 |
| 4,639,299 | 1/1987 | Turpin et al. .................. 204/181.7 |
| 4,806,611 | 11/1989 | Hoenel et al. .................. 528/45 |

FOREIGN PATENT DOCUMENTS

| 250633 | 1/1988 | European Pat. Off. . |
| 424713 | 5/1991 | European Pat. Off. . |

*Primary Examiner*—Peter D. Mulcahy
*Attorney, Agent, or Firm*—Foley & Lardner

[57] ABSTRACT

Solvent-free aqueous synthetic-resin dispersions comprising a polymer (A) which is obtained by polymerization of (A1) capped polyisocyanates in which some of the capping groups contain an ethylenically unsaturated group, and (A2) ethylenically unsaturated monomers in the presence of an ionic resin (B). The resin is useful in electrodeposition coatings.

17 Claims, No Drawings

SOLVENT-FREE AQUEOUS SYNTHETIC-RESIN DISPERSION AND PROCESS FOR THE PREPARATION AND USE THEREOF

BACKGROUND OF THE INVENTION

1. Field of the Invention

The present invention relates to a solvent-free aqueous resin dispersion, a process for preparing such a dispersion, and a method of using such a dispersion.

2. Description of Related Art

In electrodeposition coating, the electrodeposition coating materials preferably employed are those whose binders comprise cationic, amine-modified epoxy resins as water-soluble base resin components. These resins can be crosslinked by being condensed and/or admixed with polyisocyanates which are blocked with alcohol groups and/or amino groups. The polyisocyanates at room temperature possess urethane and/or urea capping groups and, at elevated temperatures, give off the capping components and lead to crosslinking with the free hydroxyl groups and/or amino groups of the base resin.

For reasons of viscosity or reactivity, it is necessary to employ solvents in the preparation of the individual binder components. Thus it is preferred in the synthesis of the base resins to use protic solvent such as alcohols and glycols, and aprotic solvents such as ketones, esters or aromatic compounds, and to use aprotic solvents in the synthesis of the crosslinking component.

However, it is known that, as the solvent content in cathodic electrodeposition baths increases, there is a worsening in the throwing power and coating of cavities, instances of overcoating occur, and there is increased passage of solvents into the waste water and/or waste air. For this reason the solvents must be removed from the binders before and/or after dispersion in water, for example by distillation or ultrafiltration. It is inherent in this process that some of the solvent remains in the dispersions, and, especially when carrying out so-called stripping from the aqueous phase and ultrafiltration, relatively large quantities are obtained of a solvent/water mixture which has to be disposed of or reprocessed.

SUMMARY OF THE INVENTION

Accordingly, there is a need to provide solvent-free resin dispersions useful in electrodeposition coating.

There is also a need to provide methods of producing such resins and methods of using such resins.

Improved synthetic-resin dispersions have now been found which give coatings having a good resistance in the salt spray test and a high solvent resistance in one-coat and multicoat systems. A surprising feature is that the dispersions are stable in the pH range from 5 to 8.

In accordance with the present invention, there has been provided a solvent-free, aqueous synthetic-resin dispersion comprising a polymer (A) which is obtained by polymerization of (A1) capped polyisocyanates in which some of the capping groups contain an ethylenically unsaturated group, and (A2) ethylenically unsaturated monomers in the presence of an ionic resin (B).

In accordance with another aspect of the present invention, there has been provided a process for the preparation of a synthetic-resin dispersion as described above, which comprises mixing a mixture of an ionic resin (B) and at least one ethylenically unsaturated monomer (A2) with a fully capped polyisocyanate (A1) in which some of the capping groups carry an ethylenically unsaturated group, converting this mixture to an aqueous dispersion, and then carrying out polymerization of all of the ethylenically unsaturated groups by means of emulsion polymerization.

In accordance with another aspect of the present invention, there has been provided a process for the preparation of a synthetic-resin dispersion as described above, which comprises neutralizing a mixture of an ionic resin (B) and at least one ethylenically unsaturated monomer (A2), dispersing the product in water, adding to this dispersion a fully capped polyisocyanate (A1) in which some of the capping groups carry an ethylenically unsaturated group, and then polymerizing all of the ethylenically unsaturated groups by means of emulsion polymerization.

Further objects, features, and advantages of the present invention will become apparent from the detailed description of preferred embodiments which follows.

DETAILED DESCRIPTION

In the dispersion of the present invention, both anionic and cationic resins are suitable as ionic resin (B). Preference is given to cationic resins because they give better throwing power and protection against corrosion. Any desired ionic resins can be used in the present invention. The cationic resins preferably contain groups having an active hydrogen atom, such as hydroxyl, primary or secondary amino, or thiol groups. These active groups act as reactive centers in the curing of the coating material with crosslinking agents such as, for example, blocked polyisocyanates, and in the case of amino groups also ensure solubilization in water by protonation.

Component (B) preferably comprises an amino-epoxy resin. Preferred amino-epoxy resins are ones which have been made water-dilutable by neutralization with organic acids. Other preferred amino-epoxy resins are the carbonate-amine adducts which are described in DE 36 44 370 and EP 272 665 both of which are incorporated by reference. Amino-epoxy resins useful in the present invention generally have an amine number of from 30 to 200 (mg of KOH per g of solid resin), a hydroxyl number of from 50 to 500 (mg of KOH per g of solid resin) and an average molecular mass (Mn) of from 250 to 10,000, preferably from 300 to 5000. The lower limit of the amine number should preferably be 45, particularly preferably 70, while the upper limit should preferably be 150, particularly preferably 100. If the amine number is too low, then the solubility is insufficient or, because of too high a degree of neutralization, the pH of the deposition baths is too acid. If the amine number is too high, then deposition is accompanied by the formation of a poorly adhering film or a blistered surface.

Examples of useful amino-epoxy resins include reaction products of resins containing epoxide groups, preferably terminal epoxide groups, from the classes of polyglycidyl ethers, polyglycidyl esters and polyglycidylamines, with saturated and/or unsaturated secondary and/or primary amines or amino alcohols. These products may be modified by at least one primary and/or secondary hydroxyl group, by a dialkylamino group and/or by a primary amino group which is temporarily protected by means of ketimine formation.

Advantageously, amino-epoxy resins which contain hydroxyl groups are obtained from polyglycidyl ethers having preferably two 1,2-epoxide groups per molecule. The term polyglycidyl ethers in the context of this invention refers preferably to those polyglycidyl ethers of the formula

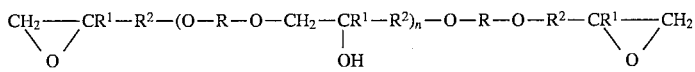

where

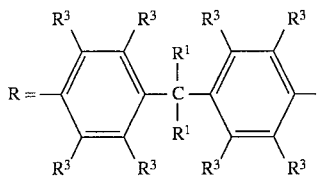

the $R^1$'s are independently —H and/or —$C_mH_{2m+1}$
the $R^2$'s are independently —$(CR^1)_m$—, preferably —$CH_2$—
the $R^3$'s are independently —$R^1$, halogen or preferably H
$n=0$ to 8, preferably 1 to 6
$m=1$ to 8, preferably 1.

These polyglycidyl ethers generally have a number average molecular mass (Mn) of from approximately 300 to 5000 and an epoxide equivalent weight of from about 170 to 2500. Examples of these ethers are reaction products of epichlorohydrin or methylepichlorohydrin with dihydroxydiphenylmethane (bisphenol F) or dihydroxydiphenylpropane (bisphenol A) and with dihydroxybenzophenone, dihydroxynaphthalene and/or resorcinol. Polyepoxides of appropriate molecular weight are prepared either by selecting the molar ratios of bisphenol to epichlorohydrin or by reacting the monomeric diglycidyl compounds with further bisphenol while adding catalysts such as Lewis acids or phosphonium salts.

The epoxy resins may be completely or partially hydrogenated or may be employed in mixtures with differing structure and molecular mass. Furthermore, elasticization can be achieved by replacing part of the polyglycidyl ether described by aliphatic polyglycidyl ethers of the formula

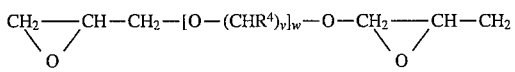

where
the $R^4$'s are independently H or an alkyl radical, preferably a lower alkyl having 1 to 6 carbon atoms, wherein alkyl, if desired, is provided with various substituents, and
v is an integer from 2 to 6 and
w is an integer from 5 to 50.

Examples are glycidyl ethers of bisphenol A and bisphenol F polypropylene glycol and polyethylene glycol ethers (of different molecular weight). The modified epoxy resins can also be modified by reaction with long-chain polyalcohols such as hexane-1,6-diol, neopentylglycol, bisethoxylated neopentylglycol, neopentylglycol hydroxypivalate and bis(hydroxymethyl)cyclohexane, monoanhydropentaerythritol and polytetrahydrofurandiol, polycaprolactonediol, polycaprolactamdiol or polybutadienediol, in the presence of appropriate basic or acidic catalysts, such as boron fluoride/amine complexes. Whereas polyalcohols containing primary OH groups can be reacted directly with polyglycidyl ethers given suitable catalysis, secondary OH groups are reacted first with diisocyanate. The resulting NCO-terminated reaction product can then be incorporated without difficulties as a bridge between 2 mol of polyglycidyl ether, with an increase in the molecular weight.

A detailed listing of useful epoxide compounds for preparing the amino-epoxy resins can be found in the handbooks *Epoxidverbindungen und Harze* [*Epoxide Compounds and Resins*] by A. M. Paquin, Springer Verlag Berlin 1958, chapter IV and *Handbook of Epoxy Resins* by H. Lee, K. Neville, McGraw-Hill Book Company, New York 1982, Reissue, and *Epoxy Resin Chemistry and Technology* by C. A. May, Marcel Dekker Inc., New York and Basle 1988.

The epoxy resin may also be modified with saturated or unsaturated polycarboxylic acids and/or hydroxyalkylcarboxylic acids. Examples of aliphatic, cycloaliphatic and/or aromatic polycarboxylic acids with different chain lengths are adipic acid, sebacic acid, fumaric acid, isophthalic acid, and dimeric fatty acid. The term hydroxyalkylcarboxylic acids refers to lactic acid or dimethylolpropionic acid or alternatively to polyesters which contain carboxyl and hydroxyl groups. The reaction of excess polyglycidyl ether of low molecular weight with polycarboxylic acids and/or with polyalcohols results in modified polyglycidyl ether intermediates which then react further with amines and/or with amino alcohols.

It is also possible to use heterocyclic polyepoxide compounds, such as 1,3-diglycidyl-5,5-dimethylhydantoin, triglycidyl isocyanurate or diepoxides of bisimides. Another suitable class of polyepoxides comprises polyglycidyl ethers of phenolic novolak resins, by means of which the functionality can be increased from 2 to about 6 glycidyl groups per molecule. By defunctionalization using long-chain alkylphenols such as dodecylphenol, it is possible in addition to incorporate elasticizing elements. Other possibilities for use are polyglycidyl esters of polycarboxylic acids, such as diglycidyl hexahydrophthalate, diglycidyl tetrahydrophthalate or diglycidyl fumarate.

To form the amino-epoxy resins, the amino groups are introduced into the epoxy resins either by addition of NH-reactive compounds to the epoxide group, or by reaction of the hydroxyl groups of the basic resin with basic monoisocyanates, which are formed by reacting aromatic and/or aliphatic and/or cycloaliphatic di- or polyisocyanates with a dialkylaminoalkanol. See DE-A-27 07 405, which is incorporated by reference.

NH-reactive compounds which are useful include primary amines such as methylamine, ethylamine, propylamine, butylamine, octylamine, monoethanolamine, 2-ethylhexylamine, dimethylaminopropylamine, diethylaminoethylamine, dimethylaminoneopentylamine or methoxypropylamine, and/or, preferably, secondary amines such as dialkylamines, monoalkylhydroxylalkylamines or dihydroxyalkylamines. Examples of such compounds are dimethylamine, diethylamine, dipropylamine, dibutylamine, methylbutylamine, dimethylaminopropylamine, N-methylaminoethanol, or diethanolamine, or alternatively cyclic amines such as morpholine or oxazolidine. When primary amines are employed, the amine reacts with 1 or 2 epoxide groups depending on the stoichiometric conditions which prevail, accompanied by enlargement of the molecule.

It is also possible to employ primary amines of the formula

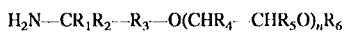

or secondary amines of the formula

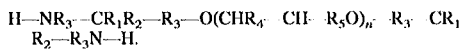

In this formula $R_1$ and $R_2$ are hydrogen, alkyl groups or —$CH_2$—OH groups, $R_3$ is a linear or branched alkylene radical, in particular an alkylene radical having 1 to 3 carbon atoms, $R_4$ and $R_5$ are hydrogen or alkyl radicals having 1 to 4 carbon atoms, $R_6$ is hydrogen, an alkyl, cycloalkyl or phenyl radical, preferably an alkyl radical having 1 to 6 carbon atoms, and n=0–5.

Examples of such monoamines are: ethanolamine, propanolamine, butanolamine, ethylene glycol 2-aminoethyl ether ($H_2N$—$CH_2$—$CH_2$—O—$CH_2$—$CH_2$—OH), and diethylene glycol mono-3-aminopropyl ether ($H_2N$—$(CH_2)_3$—O—$CH_2$—$CH_2$—O—$CH_2$—$CH_2$—OH). When primary amines are employed the amine reacts with the epoxide group depending on the stoichiometric conditions prevailing, with enlargement of the molecule. Examples of diamines are: the Jeffamine® M series, the Jeffamine® D, series and the Jeffamine® ED series.

Also suitable amines for reaction with the epoxy resins are di- or triamines with primary and/or secondary amino groups, such as laurylpropylenediamine and tallow-fatty propylenediamine.

Secondary diamines cause extension of the chain. The secondary diamines used, which are preferably long-chain diamines, are N,N'-dialkyldiaminoalkanes such as, for example, N,N'-bis(isohexyl)-1, 6-diaminohexane, N,N'-bis(isohexyl)isophoronediamine, N,N'-bis(isohexyl)dimethylhexamethylenediamine, N,N'-bis(isohexyl)-2-methylpentamethylenediamine, N,N'-bis(isohexyl)ethylenediamine, and N,N'-bis(isohexyl)di(4-aminocyclohexyl)methane, or reaction products of saturated glycidyl ethers or glycidyl esters or epoxyalkanes with primary diaminoalkanes, such as the addition product of hexane- 1,6-diamine or 2-methylpentamethylenediamine with 2 mol of the glycidyl ester of Versatic acid (α-branched monocarboxylic acids, especially $C_9$–$C_{11}$).

Other monoepoxides which can be employed for the amino-epoxy resin for this purpose are saturated or unsaturated glycidyl ethers or α-epoxides of varying chain lengths, such as 1,2-epoxydodecane or butylene oxide. In this context, the appropriate number of hydroxyl groups comes about on the one hand automatically from the epoxide group on addition of the secondary amino groups, while on the other hand it can be controlled by using hydroxyalkylamines. Other secondary diamines which can be employed are the reaction product of 2 mol of 2-ethylhexylamine with 1 mol of Beckopox® EP 075 (diglycidyl ether based on propylene oxide) and/or 1 mol of Beckopox® EP 140, and aliphatic secondary diamines based on propylene oxide adducts of diols or triols, for example Novamin® grades.

The molar ratios between compounds containing epoxide groups and containing amino groups preferably should be chosen so as to ensure the complete incorporation of the amine, since otherwise rupture-like surface defects may occur during electrophoretic coating, i.e., a slight excess of epoxide groups is advantageous.

All the amines can be reacted simultaneously with the epoxide groups, or a stepwise procedure can be followed. The reaction of the amines commences even at room temperature and is generally exothermic. In order to achieve complete reaction, it is generally necessary to increase the temperature for a time to about 50° to 120° C.

An advantageous procedure for the preparation of the amino-epoxy resin is one in which the epoxy resin is first dissolved in one or more ethylenically unsaturated monomers (A2) which can be polymerized by free-radical polymerization, and then reacted with the amines.

In a particularly preferred preparation variant, the epoxy resins—dissolved in the unsaturated monomers (A2)—are metered into a mixture of the corresponding amines, bisphenol A and ethylenically unsaturated monomers (A2).

For crosslinking reactions, hydroxyl groups generally must always be present in the amino-epoxy resin. The hydroxyl number in the molecule (expressed in mg of KOH per gram of solid resin) is critical for the cross-linkability of the film. It should be more than 50, preferably more than 100 and particularly advantageously when more than 150. The upper limit of the hydroxyl number is 500, more advantageously when less than 300. If the hydroxyl number is too low, then crosslinking gives rise to films which are still soluble in organic solvents such as methyl ethyl ketone. If, on the other hand, the hydroxyl number is too high, then the film becomes too brittle and may possibly also remain too hydrophilic. The molecule must contain at least two crosslinkable, preferably primary hydroxyl groups.

The primary and/or secondary hydroxyl groups which are important for the crosslinking process may in part be replaced by primary and/or secondary amino groups. The introduction of primary amino groups into the basic resin structure is preferably carried out by reacting resins containing at least one, preferably at least two, epoxide groups per molecule with an amino and/or hydroxyl group-containing ketimine and/or aldimine and/or polyamine. The ketimines are prepared in accordance with known methods, by eliminating water from the corresponding polyamines of the structure R—NR—R—$NH_2$ or the corresponding amino alcohols of structure HO—R—$NH_2$ and the appropriate aliphatic ketones such as diethyl ketone, methyl isobutyl ketone, or ethyl n-propyl ketone or else cyclopentanone, cyclohexanone, acetophenone etc. Preferred ketimines are reaction products of methyl isobutyl ketone and diethylenetriamine. The reaction conditions (reaction temperature, choice of solvent) must be controlled such that no substances which decompose the ketimine bond, such as water, remain present in the reaction product.

The ketimine protects the primary amino group, (see U.S. Pat. No. 3,523,925) so that the amine can be reacted with the basic epoxy resin without difficulties via a further functional group, for example a hydroxyl group or preferably a secondary amino group. The choice of the molar ratios of the components employed must ensure that substantially no unreacted low molecular weight amine remains in the batch, since otherwise rupture-like surface defects can occur during electrophoretic coating. The reaction of the secondary amino groups of the polyaminoketimine with the epoxide group commences even at room temperature and is generally exothermic. In order to achieve complete reaction, it is generally necessary to increase the temperature to from 50° to 120° C. for a time.

Any desired polyisocyanates can be capped to form (A1). Any desired capping groups can be used, so long as at least a portion are ethylenically unsaturated groups. The capped polyisocyanates of this invention carry at least two different capping agents, one or more being selected from saturated capping agents being free from ethylenic unsaturation, and one or more being selected from unsaturated capping agents containing each at least one ethylenic unsaturation. The capped polyisocyanates which carry ethylenically unsaturated groups, component (A1), are generally prepared by reacting a polyisocyanate with an at least equimolar quantity of a monofunctional compound which contains active hydrogen (Zerewitinoff reaction), and which is free from ethylenic unsaturation, referred to below as saturated capping agent, with the possible addition, if desired, of basic catalysts such as tertiary amines or small amounts of tin salts such as dibutyltin dilaurate. In this way one of the isocyanate groups is protected at room temperature against reactions with water or alcohols. The protective group is eliminated again at baking temperatures of between 110° C. and 210° C., preferably below 190° C. and in particular below 180° C., so that a crosslinking reaction can take place with the hydroxyl groups of the basic resin.

Compounds which block the isocyanates may contain only one free amine, amide, lactam, thiol, or hydroxyl group. Examples of compounds which have proven suitable for this purpose are aliphatic or cycloaliphatic alcohols such as methanol, ethanol, propanol, butanol, pentanol, hexanol, 2-ethylhexanol, 2-pyridylmethanol, or dialkylamino alcohols such as dimethylaminoethanol, oximes such as methyl ethyl ketoxime, lactams such as e-caprolactam or 2-pyrrolidone, imides such as phthalimide or N-hydroxymaleimide, hydroxyalkyl esters, malonic esters, or acetoacetic esters. β-Hydroxy glycols or β-hydroxy glycol ethers and glycolamides are also recommended.

The remaining free isocyanate groups are blocked analogously with unsaturated capping agents which contain not only an active hydrogen atom but also an ethylenically unsaturated group. Any blocking compounds can be used which have such an unsaturated group. Compounds which are particularly suitable for this purpose are NH- and OH-functional unsaturated monomers such as primary and secondary allylamines and/or unsaturated alcohols, such as hydroxyalkyl acrylates, preferably hydroxyethyl (meth)acrylate or hydroxypropyl (meth)acrylate or hydroxybutyl (meth)acrylate or monofunctional, unsaturated isocyanates such as, for example, dimethyl-meta-isopropenylbenzyl isocyanate (meta-TMI). Other compounds which can be used as ethylenically unsaturated capping components are reaction products of maleic anhydride with diols, for example those based on ethylene oxide and/or propylene oxide, or reaction products of monoepoxides, for example Versatic acid glycidyl ester, with acrylic or methacrylic acid.

Typical and suitable polyfunctional isocyanates to be blocked include aliphatic, cycloaliphatic and/or aromatic polyisocyanates having at least two isocyanate groups per molecule. Suitable aromatic diisocyanates are the isomers or isomer mixtures of phenylene diisocyanate, tolylene diisocyanate, xylylene diisocyanate, biphenylene diisocyanate, naphthylene diisocyanate and diphenylmethane diisocyanate, diphenyl tetraisocyanate, preferably naphthyl tetraisocyanate, tolylene diisocyanate, isophorone diisocyanate, and xylylene diisocyanate.

Because of their good resistance to ultraviolet light, (cyclo)aliphatic diisocyanates give products with little tendency to yellowing and are thus advantageously used. Examples of such compounds are isophorone diisocyanate, cyclopentylene diisocyanate, and the hydrogenation products of aromatic diisocyanates, such as cyclohexylene diisocyanate, methylcyclohexylene diisocyanate, and dicyclohexylmethane diisocyanate, and aliphatic diisocyanates of the formula

$$O{=}C{=}N{-}(CR_2)_r{-}N{=}C{=}O$$

in which r is an integer from 2 to 20, in particular from 6 to 8, and R is hydrogen or a lower alkyl radical having 1 to 8 carbon atoms, preferably 1 or 2 carbon atoms. Examples thereof are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate, and trimethylhexane diisocyanate. Particularly preferred are diphenylmethane diisocyanate and tolylene diisocyanate and their isomer mixtures, and also isophorone diisocyanate, dicyclohexylmethane diisocyanate, trimethylene diisocyanate, tetramethylene diisocyanate, and hexamethylene diisocyanate. Vinyl polymers which contain isocyanate groups and are prepared by copolymerization of, for example, cyanatoethyl (meth)acrylate or dimethylisopropylbenzyl isocyanate with alkyl (meth)acrylates and/or (alkyl)vinylbenzenes can also be used. Other suitable compounds are mixed aliphatic/aromatic isocyanates.

A particularly preferred capped isocyanate is formed by the reaction of aromatic diisocyanates with butylglycol and/or butyldiglycol together with hydroxyethyl (meth)acrylate and/or hydroxypropyl (meth)acrylate and/or hydroxybutyl (meth)acrylate. This reaction preferably leads to systems which can be baked in the range from 150°–180° C.

Baking temperatures of 110°–180° C. can be realized preferably by using systems based on aliphatic diisocyanates, which systems contain as capping component methyl ethyl ketoxime, methyl isobutyl ketoxime, dodecanone ketoxime or hydroxyacetone or hydroxybutanone, or secondary amines such as dimethylamine, diethylamine, dipropylamine, dibutylamine, dipentylamine and dihexylamine and isomers thereof, such as diisopropylamine, and are preferably reacted with ethylenically unsaturated compounds such as hydroxyethyl (meth)acrylate and/or hydroxypropyl (meth)acrylate and/or hydroxybutyl (meth)acrylate.

For 1 mol of diisocyanate the molar ratio of saturated capping component to ethylenically unsaturated capping component is preferably between 1.95:0.05 and 0.05:1.95, particularly preferably between 1.50:0.50 and 1.05:0.95.

For the synthesis of the capped polyisocyanate (A1), the corresponding isocyanate can be dissolved, prior to addition of the two capping agents, in the unsaturated monomers (A2) which are inert with respect to the isocyanate group, or in mixtures thereof. As an alternative to this, it is also possible for the unsaturated monomer (A2) to be added to the isocyanate even after the addition of the saturated capping agent and of the ethylenically unsaturated capping agent. The unsaturated capping agent can either be metered into the corresponding isocyanate together with the saturated capping agent or vice versa.

Another variant comprises the semi-blocking, in addition to the capped polyisocyanates (A1) and in a stoichiometrically appropriate manner, of further polyisocyanates of the type described above with the described monoalcohols and/or amines, in which case reaction products of butylglycol and/or butyldiglycol with tolylene diisocyanate and methyl ethyl ketoxime with isophorone diisocyanate and (tetramethyl)xylylene diisocyanate are preferred. The semi-capping can be carried out in bulk, without solvent, or in the monomers described. Such semi-blocked diisocyanates are then subjected to an addition reaction via the remaining NCO function, either before or preferably after the reaction of the epoxy resins with the amines, with the free hydroxyl and/or amino groups of the epoxy resin or, respectively, of the amino-epoxy resin, this addition reaction preferably being carried out in the presence of the monomers (A2). In this manner, so-called auto-crosslinking systems are obtained, which are likewise a subject of this invention.

Any desired unsaturated monomer or mixture of unsaturated monomers, can be used as (A2). Suitable unsaturated monomers (A2), which may already be present during the synthesis of the amino-epoxy resin or else during the synthesis of the blocked isocyanate or are added after the synthesis thereof, are preferably acrylic or methacrylic esters of monoalcohols containing from 1 to 18 carbon atoms, preferably n-butyl methacrylate, methyl methacrylate, isobutyl acrylate, 2-ethylhexyl acrylate, and especially butyl acrylate. Other suitable monomers are styrene, vinyltoluene or α-methylstyrene, or more highly substituted styrenes such as 2,4-dimethylstyrene, and also vinyl esters of monocarboxylic acids containing from 2 to 15 carbon atoms, for example vinyl acetate, vinyl propionate, vinyl pivalate or vinyl Versatate. Particularly, monomers (A2) are preferably styrene, vinyltoluene and α-methylstyrene.

Further suitable unsaturated monomers (A2) are hydroxy-$C_2$-$C_4$-alkyl acrylates, preferably hydroxyethyl (meth)acrylate or hydroxypropyl (meth)acrylate, or monomers containing unsaturated 1,2-epoxide groups, such as glycidyl (meth)acrylate. Monomers of this kind, because of their reactive groups, cannot be added until after the synthesis of the amino-epoxy resin or of the capped isocyanate. The quantity of unsaturated monomers or of polymer formed from (A2) is generally from about 1 to 80% by weight, preferably from 5 to 30% by weight, based on the total quantity of all components, the sum of which calculated as solids equals 100.

The mixing ratio of components (B) to (A1) is preferably between 90:10 and 60:40% by weight and is empirically determined from the optimum achievable applications properties at the given baking temperature. Components (B) and (A1), preferably in the form of their mixtures with the unsaturated monomers (A2), can either be mixed cold in the ratio described, or component (A1) is added at elevated temperature to component (B), which is produced in situ. Subsequently, additives and acids which are customary in paint processing are added.

The crosslinking of the OH group-containing component (B) with the blocked polyisocyanates (A1) can, if desired, be accelerated by adding from 0.01 to 2% by weight, specifically from 0.5 to 1% by weight, based on the sum of components (B) and (A1), of strongly basic tertiary amines and/or active metal compounds. A particular and sometimes synergistic effect is achieved if the OH group-containing resin deposited is present in a strongly basic medium and the metal salts are taken from bismuth, lead, cobalt, iron, antimony, and/or tin(II) and tin(IV). It is particularly preferred to employ catalysts such as iron(III) acetylacetonate, dibutyltin dilaurate, dibutyltin oxide, tri-n-butyltin oxide, dibutyltin dioctylmaleate, tin octanoate, tin oleate, tetrabutyl titanate, cobalt 2-ethylhexanoate, and reaction products of bismuth trioxide with hydroxycarboxylic acid such as lactic acid and/or dimethylolpropionic acid.

By protonation with acids the cationic binder is rendered dilutable with water in a manner known per se. Examples of acids are formic acid, lactic acid, acetic acid, propionic acid, dimethylolpropionic acid, oxalic acid, citric acid, malonic acid, acrylic acid, phosphoric acid, and alkylphosphonic acids. Monobasic, low molecular weight organic carboxylic acids are preferred. The amount of acid added must be at least sufficient to ensure a stable emulsion of the cationic base resin. An excess of acid, i.e., a degree of neutralization of over 100%, should expediently be avoided The MEQ value (milliequivalents of acid per 100 g of solid resin) is in general between 20 and 80. The aim is for as low as possible an MEQ value, in order to obtain as high as possible a deposition equivalent.

This mixture of cationic resin (B), ethylenically unsaturated monomer (A2) and capped polyisocyanate (A1) is then processed further with demineralized water at a preferred temperature of 60°–95° C., to give an emulsion, either by direct or inverted dilution. In the resulting emulsion, free-radical initiators are added in order subsequently to polymerize the unsaturated monomers (A2) present, in accordance with known emulsion polymerization techniques, to give dispersions having a solid content of 30 to 60% preferably 30 to 40%. The free-radical initiators used may be both all known redox systems and thermally decomposing free-radical initiators such as azo compounds, peroxides, peracid esters, and hydroperoxides. Preference is given to tert.-butyl hydroperoxide/ascorbic acid and tert-amyl hydroperoxide/ascorbic acid.

The molecular weights of the resulting polymer resins of the monomers (A2), determined by the gel permeation chromatography method, are between 10,000 and 2,000,000 g/mol, preferably between 30,000 and 600,000 g/mol. For fine adjustment of appropriate molecular weights it is possible, if desired, to employ regulators such as alcohols, polyethers, thiols, or hypophosphoric acid. The polymerization temperatures are in general between about 20° and 98° C. They depend on the desired molecular weight range, on the polymerization initiators used and on the activity optimum of the latter.

For the preparation of binders for electrodeposition coating materials which are baked in a range from 110°–150° C., the following method is preferred in particular. After preparing component (B) in the unsaturated monomers (A2), the batch is neutralized with acid and subjected to direct or inverted dilution with fully demineralized water. Component (A1), blocked with the alcohols described on the basis of aliphatic diisocyanates, is metered into this dispersion at temperatures <80° C., and this newly formed dispersion is finally subjected to emulsion or suspension polymerization at temperatures of <80° C. by the addition of an initiator.

The dispersions according to the invention are outstandingly suitable as ionically stabilized, water-based binders. Further processing to give electrodeposition coating materials is particularly preferred, which involves the aqueous binder dispersion being admixed with pigments, such as titanium dioxide and carbon black, and, if desired, catalysts, both of which are preferably incorporated via an aqueous pigment paste.

The preparation of pigment pastes is generally known and requires no further description here. See D. H. Parker, *Principles of Surface Coating Technology*, Interscience Publishers, New York (1965); R. L. Yates, *Electropainting*, Robert Draper Ltd., Teddington/England, (1966); H. F. Payne, *Organic Coating Technology*, volume 2, Wiley and Sons, New York (1961).

These electrodeposition coating materials, based on the dispersions according to the invention, may contain lead silicate as anticorrosion pigment. However, a particular advantage lies in the fact that the dispersions according to the invention are suitable for lead-free electrodeposition coating materials.

PREPARATION EXAMPLES

1.1 Preparation of the Capped-polyisocyanate Crosslinking Agents (A1)

Crosslinking Agent B-1

In a reaction vessel fitted with stirrer, thermometer, dropping funnel, and reflux condenser, 243 g of butyldiglycol, 0.59 g of hydroquinone and 65 g of hydroxyethyl methacrylate are metered, at room temperature, under a countercurrent stream of compressed air and at a rate such that the internal temperature does not exceed 70° C., into 174 g of tolylene diisocyanate (TDI) and 0.05 g of DBTL (dibutyltin laurate). The batch is maintained at 70° C. until an NCO value of <0.1% is reached, and is subsequently diluted with 30.9 g of n-dodecanethiol.

Solids content: 94% by weight

Crosslinking Agent B-2

In a reaction vessel fitted with stirrer, thermometer, dropping funnel, and reflux condenser, 250 g of diphenylmethane diisocyanate (Desmodur® M 44) are melted at 45° C. As soon as a homogeneous melt is formed, 0.05 g of DBTL (dibutyltin laurate) are admixed, and then 243 g of butyldiglycol, 0.59 g of hydroquinone and 65 g of hydroxyethyl methacrylate are metered in under a countercurrent stream of compressed air and at a rate such that the internal temperature does not exceed 70° C. The batch is maintained at 70° C. until an NCO value of <0.1% is reached, and is subsequently diluted with 31.3 g of n-dodecanethiol.

Solids content: 95% by weight.

Crosslinking Agent B-3

In a reaction vessel fitted with stirrer, thermometer, dropping funnel, and reflux condenser, 130.5 g of methyl ethyl ketoxime, 0.59 g of hydroquinone and 65 g of hydroxyethyl methacrylate are metered, at room temperature, under a countercurrent stream of compressed air and at a rate such that the internal temperature does not exceed 70° C., into a mixture of 244 g of tetramethylxylylene diisocyanate (TMXDI) and 0.05 g of DBTL (dibutyltin laurate). The batch is maintained at 70° C. until an NCO value of <0.1% is reached, and is subsequently diluted with 29.6 g of n-dodecanethiol.

Solids content: 94% by weight.

COMPARATIVE EXAMPLE

Crosslinking Agent B-5 (trimer in toluene)

In a reaction vessel fitted with stirrer, thermometer, dropping funnel, and reflux condenser, 80.91 g of butyl glycol are metered at room temperature and at a rate such that the internal temperature does not exceed 50° C. into a solution of 119.1 g of tolylene diisocyanate (TDI) and 0.05 g of DBTL (dibutyltin laurate) in 57.74 g of toluene. As soon as an NCO value of 12.48% (calculated with respect to solid resin) has been reached, 30.63 g of trimethylolpropane are added in 3 portions. The temperature is subsequently maintained at below 90° C. until an NCO value of <0.2% has been reached. The batch is then diluted with 66.40 g of methoxypropanol.

Solids content: 65.0 % by weight.

1.2 Preparation of the Amino-epoxy Resin (B)

Amino-epoxy Resin A1

In a reaction vessel fitted with stirrer, thermometer, dropping funnel, and reflux condenser, 31.78 g of diethanolamine are metered at 40° C. into a solution of 428.62 g of a polyglycidyl ether based on bisphenol A and having an epoxide equivalent weight of 472, 142.27 g of styrene and 0.40 g of ionol. 15.44 g of dimethylaminopropylamine and 93.23 g of an adduct of 116 g of 1,6-diaminohexane with 500 g of Cardura® E 10 (glycidyl ester of an alpha-branched $C_9$–$C_{11}$ monocarboxylic acid) are then added at 40°–50° C. and the solution is slowly heated to 90°–100° C. To complete the reaction, the temperature indicated is maintained for a further 3 hours. After this time the epoxide content is zero.

Amine number: 98 (mg of KOH/g of solid resin).

Solids content: 80.00% by weight.

Amino-epoxy Resin A2

In a reaction vessel fitted with stirrer, thermometer, dropping funnel, and reflux condenser, a mixture of 332.18 g of Epikote 828 (bisphenol A diglycidyl ether) in 71.14 g of styrene is added slowly to a solution, heated at 100° C., of 45.45 g of bisphenol A, 31.78 g of diethanolamine, 15.44 g of dimethylaminopropylamine and 93.23 g of an adduct of 116 g of 1,6-diaminohexane with 500 g of Cardura® E 10 (glycidyl ester of an alpha-branched $C_9$–$C_{11}$ monocarboxylic acid) in 71.14 g of styrene. The resulting heat of reaction given off is used to raise the temperature to 120° C. To complete the reaction, the temperature indicated is maintained for a further 2 hours. After this time the epoxide content is zero.

Amine number: 98 (mg of KOH/g of solid resin).

Solids content: 80% by weight.

COMPARATIVE EXAMPLE

Amino-epoxy Resin A3

In a reaction vessel fitted with stirrer, thermometer, dropping funnel, and reflux condenser, 42.00 g of diethanolamine are metered at 40° C. into a solution of 566.4 g of a polyglycidyl ether based on bisphenol A and having an epoxide equivalent weight of 472 in 322.0 g of methoxypropanol. 20.4 g of dimethylaminopropylamine and 123.2 g of an adduct of 116 g of 1,6-diaminohexane with 500 g of Cardura® E 10 (glycidyl ester of an alpha-branched $C_9$–$C_{11}$ monocarboxylic acid) are then added at 40°–50° C. and the solution is slowly heated to 90°–100° C. To complete the reaction, the temperature indicated is maintained for a further 3 hours. After this time the epoxide content is zero.

Amine number: 98 (mg of KOH/g of solid resin).

Solids content: 70% by weight.

1.3 Aqueous Dispersions D-1, D-2, D-4 and D-5

In a reaction vessel fitted with stirrer, thermometer, dropping funnel, and reflux condenser, crosslinking agent B is added to a solution, heated at 90°–100° C., of amino-epoxy resin A in styrene, and this mixture is neutralized with 16.24 g of 85% strength formic acid. Subsequently, the quantity of demineralized water indicated in Table 1 is mixed in, at 90° C. the stated quantity of initiator solution of ascorbic acid/ tert-butyl hydroperoxide in 100 g of demineralized water is metered in over 0.5 hour, and polymerization is carried out at 90° C. until the solids content is constant (sample weight 1–2 g, conditions: 125° C., 1 h). The dispersions D-1, D-2, D-4 and D-5 represented in Table 1 are obtained in accordance with this general procedure.

Solids content: 35% by weight.

| | |
|---|---|
| MEQ | 30 |
| Residual solvent (by gas chromatography): | |
| MOP | 2.0–2.5% |
| Toluene | 0.2–0.5% |

TABLE 1

| Dispersion | Epoxy amine | Crosslinking agent | Deionized water | Initiator mixture | Reaction time at °C. | Solids content (1 h, 125° C.) | MEQ | Residual monomer |
|---|---|---|---|---|---|---|---|---|
| D-1 | 765.89 g A-1 | 249.11 g B-1 | 1758 g | 2.19 g | 2 h, 90 | 35% by wt. | 30 | <0.5% |
| D-2 | 765.89 g A-1 | 286.24 g B-2 MDI | 1758 g | 2.19 g | 2 h, 90 | " | " | " |
| D-3 | 774.39 g A-1 | 230.02 g B-3 | 1758 g | 2.26 g | 4 h, 75 | " | " | " |
| D-4 | 765.89 g A-2 | 249.11 g B-1 | 1758 g | 2.19 g | 2 h, 90 | 35% by wt. | 30 | <0.5% |
| D-5 | 765.89 g A-2 | 286.24 g B-2 MDI | 1758 g | 2.19 g | 2 h, 90 | " | " | " |
| D-6 | 774.39 g A-2 | 230.02 g B-3 | 1758 g | 2.26 g | 4 h, 75 | " | " | " |

D-3 and D-6:

Aqueous Dispersion D-3 and D-6 with Low-temperature Curing Agent B-3

In a reaction vessel fitted with stirrer, thermometer, dropping funnel, and reflux condenser, a solution, heated at 90°–100° C., of amino-epoxy resin A in styrene is neutralized with 16.24 g of 85% strength formic acid, and the quantity of demineralized water indicated in Table 1 is added so that the internal temperature falls to 70°–75° C. The crosslinking agent B-3 is then added slowly, and the appropriate quantity of initiator solution as indicated (ascorbic acid/tert-butyl hydroperoxide in 100 g of demineralized water) is mixed in over 0.5 hour at 70° C. Finally, polymerization is carried out at 70° C. until the solids content is constant (sample weight 1–2 g, conditions: 125° C., 1 h). The dispersions D-3 and D-6 represented in Table 1 are obtained in accordance with this general procedure.

1.4 Aqueous Dispersion D-7 (Comparative example)

(Method based on EP-A 67 312, which is incorporated by reference in its entirety.)

In a reaction vessel fitted with stirrer, thermometer, dropping funnel, and reflux condenser, a mixture, heated at 80°–85° C., of 813.27 g of amino-epoxy resin A-3, 47.0 g of Texanol, 18.9 g of 2-ethylhexanol and 355.15 g of crosslinking agent B-5 is distilled under vacuum to remove the solvent. As soon as more than 90% of the solvent has been collected, 96 g of styrene and 48 g of butyl acrylate are added, the mixture is neutralized with 15.3 g of 85% strength formic acid, and the batch is dispersed with the continuous addition of 1552.0 g of demineralized water.

After addition of 1.69 g of ascorbic acid/tert-butyl hydroperoxide in 100 g of fully deionized water over 0.5 hour, polymerization is carried out at 90° C. until the solids content is constant (sample weight 1–2 g; conditions: 125° C., 1 h).

-continued

| | |
|---|---|
| Total | 2.2–3.0% |

2. Preparation of a Pigment Paste 2.1 Preparation of a Paste Resin 2.1.1 1708 parts (4 mol) of Denacol EX-145 (phenol (EO5) glycidyl ether) are run at 60°–80° C. over the course of one hour into a solution of 204 parts (2 mol) of N,N-dimethylaminopropylamine in 1224 parts of ethoxypropanol, and the mixture is subsequently maintained at 80°–100° C. until an EP number of virtually 0 has been reached (amine number approximately 117 mg of KOH/g of solid; about 50%.

2464 parts of the adduct prepared in 2.1.2 are added to this solution, and this mixture is maintained at 60°–80° C. until an acid and epoxy number of virtually 0 has been reached. The solvent is subsequently removed in vacuo, and 128 parts of butylglycol and 400 parts of lactic acid (90%) are added. Dispersion is carried out by continuous addition of 2245.24 parts of fully deionized water, to give a solids content of 55%.

2.1.2 1280 parts (2 equivalents of epoxide) of Beckopox® SEP 311 (75% strength in xylene) are heated to 80° C. 1184 parts of the urethane according to 2.1.3. (75% strength) are run over the course of one hour into this solution, and the mixture is maintained at 80° C. until the % NCO value is virtually 0. Subsequently the solvent is removed in vacuo and the mixture is diluted to approximately 60% with 1232 parts of ethoxypropanol.

2.1.3 540 parts of isooctadecyl alcohol and 0.9 parts of dibutyltin laurate are run at 40°–60° C. over the course of one hour into 348 parts of Desmodur® T 80 (80% 2,4-, 20% 2,6-tolylene diisocyanate) in 296 parts of xylene, and the mixture is subsequently maintained at this temperature until the %NCO value is approximately 9.5 (about 75%).

2.2 Preparation of the Lead-free Pigment Paste P-1

A vessel fitted with a stirrer is charged with 13.88 parts of the binder according to 2.1.1., 3.13 parts of Texanol, 0.84 part of acetic acid (50% strength) and 1.97 parts of a 1:1 mixture of 2,4,7,9-tetramethyl-5-decyne- 4,7-diol (Surfynol® 104, wetting agent) and Sektol®. 3.66 parts of dibutyltin oxide, 0.31 part of carbon black, 38.14 parts of titanium dioxide, 0.61 part of Aerosil and 37.45 parts of fully deionized water are metered into this mixture while stirring. After stirring for one hour, the pigment paste mixture is ground in a bead mill for 1 hour with cooling (SAZ beads: 0.1 mm).

2.3 Preparation of the Lead-containing Pigment Paste P-2

A vessel fitted with a stirrer is charged with 13.88 parts of the binder according to 2.1.1., 3.13 parts of Texanol, 0.84 part of acetic acid (50% strength) and 1.97 parts of a 1:1 mixture of 2,4,7,9-tetramethyl-5-decyne- 4,7-diol (Surfynol® 104, wetting agent) and Sektol®. 3.66 parts of dibutyltin oxide, 0.31 part of carbon black, 3.67 parts of lead silicate, 38.14 of titanium dioxide, 0.61 part of Aerosil and 33.78 parts of fully deionized water are metered into this mixture while stirring. After stirring for one hour, the pigment paste mixture is ground in a bead mill for 1 hour with cooling (SAZ beads: 0.1 mm).

3.1 Formulation of the Lead-free Cathodic electrodeposition paints L-1 to L-6

1268.57 parts of the 35% strength binder dispersion (D-1–D-6) are placed in a glass beaker fitted with a stirrer, 1.5 g of formic acid (50%) are added, and the mixture is diluted with 2010.93 parts of fully deionized water. Subsequently, 418.80 parts of the pigment paste P-1 prepared in section 2.2 are added.

3.2 Preparation of the Lead-containing Cathodic Electrodeposition Paints L-7 to L-12

1268.57 parts of the 35% strength binder dispersion (D-1–D-6) are placed in a glass beaker fitted with a stirrer, 1.5 g of formic acid (50%) are added, and the mixture is diluted with 2010.93 parts of fully deionized water. Subsequently, 418.80 parts of the pigment paste (P-2) prepared in section 2.3 are added.

3.3 Preparation of a Lead-free Cathodic Electrodeposition Paint L-13

1268.57 parts of the 35% strength binder dispersion (D-7) are placed in a glass beaker fitted with a stirrer, 1.5 g of formic acid (50%) are added, and the mixture is diluted with 2010.93 parts of fully deionized water. Subsequently, 418.80 parts of the pigment paste (P-1) prepared in section 2.3 are added.

3.4 Preparation of a Lead-containing Cathodic Electrodeposition Paint L-14

This paint was prepared using the same components as for cathodic electrodeposition paint L-13, but using pigment paste (P-2) instead of pigment paste (P-1).

4. Deposition Results

Bright iron panels connected as cathode were coated at 225 V for 2.5 minutes, at a bath temperature of 32° C. were rinsed with water and were baked for 30 minutes at 170° C. (coatings 1, 2, 4, 5, 7, 8, 10, 11, 13 and 14) or at 140° C. (coatings 3, 6, 9 and 12). The baked films had a dry film thickness of 20 μm and no craters.

The applications results of the lead-free formulated cathodic electrodeposition paints (L-1–L-6) and of the lead-containing cathodic electrodeposition paints (L-7–L-12) are compiled in Tables 2 and 3:

TABLE 2

| | Lead-free cathodic electrodeposition paints | | | | | | |
|---|---|---|---|---|---|---|---|
| Paste | Dispersion | Erichsen indentation (mm) | Acetone test resistance | Impact (inch pound) | Salt spray test (240) | Sieving residue (3 weeks) | Paint |
| P-1 | D-1 | 8.6 | 30 s | >80 | <1.5 mm | <50 mg/l | L-1 |
| P-1 | D-2 | 8.4 | 30 s | " | " | " | L-2 |
| P-1 | D-3 | 8.7 | 30 s | " | " | " | L-3 |
| P-1 | D-4 | 8.6 | 30 s | >80 | <1.5 mm | <50 mg/l | L-4 |
| P-1 | D-5 | 8.4 | 30 s | " | " | " | L-5 |
| P-1 | D-6 | 8.7 | 30 s | " | " | " | L-6 |
| Comparison P-1 | D-7 | 8.0 | 0 s | " | " | " | L-13 |

TABLE 3

| | Lead-containing cathodic electrodeposition paints | | | | | | |
|---|---|---|---|---|---|---|---|
| Paste | Dispersion | Erichsen indentation (mm) | Acetone test resistance | Impact (inch pound) | Salt spray test (240) | Sieving residue (3 weeks) | Paint |
| P-2 | D-1 | 8.6 | 30 s | >80 | <1.5 mm | <50 mg/l | L-7 |
| P-2 | D-2 | 8.4 | 30 s | " | " | " | L-8 |
| P-2 | D-3 | 8.7 | 30 s | " | " | " | L-9 |
| P-2 | D-4 | 8.6 | 30 s | >80 | <1.5 mm | <50 mg/l | L-10 |

TABLE 3-continued

Lead-containing cathodic electrodeposition paints

| Paste | Dispersion | Erichsen indentation (mm) | Acetone test resistance | Impact (inch pound) | Salt spray test (240) | Sieving residue (3 weeks) | Paint |
|---|---|---|---|---|---|---|---|
| P-2 | D-5 | 8.4 | 30 s | " | " | " | L-11 |
| P-2 | D-6 | 8.7 | 30 s | " | " | " | L-12 |
| Comparison P-2 | D-7 | 8.1 | 0 s | " | " | " | L-14 |

What is claimed is:

1. A solvent-free, aqueous synthetic-resin dispersion which comprises a polymer (A) obtained by polymerization of
  (A1) capped polyisocyanates in which at least a portion of the capping groups contain an ethylenically unsaturated group, and
  (A2) ethylenically unsaturated monomers other than (A1), in the presence of an ionic resin (B).

2. A synthetic-resin dispersion as claimed in claim 1, wherein the ionic resin (B) comprises a cationic resin.

3. A synthetic-resin dispersion as claimed in claim 1, wherein the ionic resin (B) comprises an amino-epoxy resin.

4. A synthetic-resin dispersion as claimed in claim 1, wherein the ionic resin (B) comprises an anionic resin.

5. A synthetic-resin dispersion as claimed in claim 3, wherein the amino-epoxy resin is water-dilutable due to neutralization with an organic acid.

6. A synthetic-resin dispersion as claimed in claim 3, wherein the amino-epoxy resin has an amine number of 30 to 200 mg of KOH per g of solid resin, a hydroxyl number of from 50 to 500 mg of KOH per g of solid resin, and a number average molecular weight of from 250 to 10,000.

7. A synthetic-resin dispersion as claimed in claim 1, wherein at least two different capping agents for the polyisocyanates are used, one or more being a saturated capping agent free from ethylenic unsaturation, and one or more being an unsaturated capping agent bearing at least one ethylenic unsaturation.

8. A synthetic-resin dispersion as claimed in claim 1, wherein for 1 mol of polyisocyanate, the ratio of ethylenically saturated capping groups to ethylenically unsaturated capping groups is from 1.95:0.05 to 0.05 to 1.95.

9. A synthetic-resin dispersion as claimed in claim 1, which is obtained by a process which comprises mixing a mixture of an ionic resin (B) and at least one ethylenically unsaturated monomer (A2) with a capped polyisocyanate (A1) in which some of the capping groups carry an ethylenically unsaturated group, converting this mixture to an aqueous dispersion, and then carrying out polymerization of all of the ethylenically unsaturated groups by means of emulsion polymerization.

10. A synthetic-resin dispersion as claimed in claim 1, which is obtained by a process which comprises neutralizing a mixture of an ionic resin (B) and at least one ethylenically unsaturated monomer (A2), dispersing the product in water, adding to this dispersion a capped polyisocyanate (A1) in which some of the capping groups carry an ethylenically unsaturated group, and then polymerizing all of the ethylenically unsaturated groups by means of emulsion polymerization.

11. A synthetic-resin dispersion as claimed in claim 1, wherein the capping group is selected from the group consisting of NH- and OH-functional unsaturated monomers, unsaturated isocyanates, reaction products of maleic anhydride with diols, and reaction products of monoepoxides with acrylic or methacrylic acid.

12. A synthetic-resin dispersion as claimed in claim 7, wherein the saturated capping agent is selected from the group consisting of aliphatic alcohols, cycloaliphatic alcohols, dialkylamino alcohols, oximes, lactams, imides, hydroxyalkyl esters, malonic esters, acetoacetic esters, beta-hydroxy glycols, beta-hydroxy glycol ethers, and glycolamides.

13. A synthetic-resin dispersion as claimed in claim 12, wherein the unsaturated capping agent is selected from the group consisting of NH- and OH-functional unsaturated monomers, unsaturated isocyanates, reaction products of maleic anhydride with diols, and reaction products of monoepoxides with acrylic or methacrylic acid.

14. A synthetic-resin dispersion as claimed in claim 7, wherein the molar ratio of saturated capping agent to unsaturated capping agent is between 1.95:0.05 and 0.05:1.95.

15. A synthetic-resin dispersion as claimed in claim 7, wherein the molar ratio of saturated capping agent to unsaturated capping agent is between 1.50:0.50 and 1.05:0.95.

16. A synthetic-resin dispersion as claimed in claim 7, wherein the unsaturated capping agent comprises hydroxy ethyl (meth)acrylate or hydroxy propyl (meth)acrylate and the saturated capping agent comprises butylglycol or butyldiglycol.

17. A synthetic-resin dispersion as claimed in claim 7, wherein the saturated capping agent comprises one or more of methyl ethyl ketoxime, methyl isobutyl ketoxime, dodecanone ketoxime, hydroxyacetone, hydroxybutanone, and secondary amines, and the unsaturated capping agent comprises one or more of hydroxyethyl (meth)acrylate, hydroxypropyl (meth)acrylate, and hydroxybutyl (meth)acrylate.

* * * * *